United States Patent
Tucker et al.

(10) Patent No.: US 10,365,686 B2
(45) Date of Patent: Jul. 30, 2019

(54) GEARED HOUSING ASSEMBLY

(71) Applicant: Lenovo (Singapore) Pte. Ltd., Singapore (SG)

(72) Inventors: Matthew Ian Tucker, Durham, NC (US); Samuel Jackson Patterson, Raleigh, NC (US); Cuong Huy Truong, Cary, NC (US); Ali Kathryn Ent, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/338,103

(22) Filed: Oct. 28, 2016

(65) Prior Publication Data
US 2018/0120895 A1 May 3, 2018

(51) Int. Cl.
*G06F 1/16* (2006.01)
*F16H 19/00* (2006.01)

(52) U.S. Cl.
CPC ......... *G06F 1/1618* (2013.01); *F16H 19/001* (2013.01); *G06F 1/1681* (2013.01); *G06F 1/1683* (2013.01)

(58) Field of Classification Search
CPC .... G06F 1/1681; G06F 1/1618; G06F 1/1683; F16H 19/001
See application file for complete search history.

(56) References Cited

U.S. PATENT DOCUMENTS

| | | |
|---|---|---|
| 5,129,276 A | 7/1992 | Fahy et al. |
| 5,946,991 A | 9/1999 | Hoopman |
| 5,987,704 A | 11/1999 | Tang |
| 6,519,812 B2 | 2/2003 | Ko et al. |
| 7,345,872 B2 | 3/2008 | Wang |
| 7,876,288 B1 | 1/2011 | Huang |
| 8,533,542 B2 | 12/2013 | Healey |
| 8,782,853 B2 | 7/2014 | Ge |
| 8,938,855 B2 | 1/2015 | Ahn et al. |
| 9,274,552 B2 | 3/2016 | Ahn et al. |
| 9,625,952 B2 | 4/2017 | Holung |
| 2004/0061683 A1* | 4/2004 | Mochizuki ............ G06F 1/1601 345/168 |
| 2005/0050686 A1* | 3/2005 | Kurokawa ............ G06F 1/1618 16/354 |
| 2005/0122671 A1 | 6/2005 | Homer |
| 2008/0232043 A1 | 9/2008 | Wang |
| 2008/0242359 A1 | 10/2008 | Seol |
| 2009/0070961 A1 | 3/2009 | Chung |
| 2009/0167691 A1* | 7/2009 | Wang .................... G06F 1/1616 345/168 |
| 2010/0123633 A1 | 5/2010 | Leung |
| 2010/0238620 A1 | 9/2010 | Fish |

(Continued)

OTHER PUBLICATIONS

Smith, Optimal shapes for Gears, NEC Research Institute, Princeton, NJ 1993 (19 pages).

*Primary Examiner* — Hoa C Nguyen
*Assistant Examiner* — Christopher L Augustin
(74) *Attorney, Agent, or Firm* — Brian J. Pangrle (57) ABSTRACT

An apparatus can include a processor; memory accessible by the processor; a first housing that includes a first geared edge and a processor; a second housing that includes a second geared edge and an electronic component accessible by the processor; and a link that operatively couples and meshes the first geared edge and the second geared edge.

20 Claims, 9 Drawing Sheets

(56) References Cited

U.S. PATENT DOCUMENTS

| | | |
|---|---|---|
| 2010/0277860 A1 | 11/2010 | Jeong et al. |
| 2011/0205695 A1* | 8/2011 | Hassemer ............ H04M 1/022 361/679.01 |
| 2012/0147535 A1 | 6/2012 | Ahn et al. |
| 2013/0170126 A1 | 7/2013 | Lee |
| 2013/0242495 A1 | 9/2013 | Bathiche |
| 2013/0279096 A1 | 10/2013 | Gengler |
| 2013/0322004 A1 | 12/2013 | Park |
| 2014/0360296 A1 | 12/2014 | Hsu |
| 2015/0023030 A1 | 1/2015 | Tsukamoto |
| 2015/0146362 A1 | 5/2015 | Meyers |
| 2015/0277491 A1 | 10/2015 | Browning |
| 2016/0048173 A1 | 2/2016 | Lyles |
| 2016/0070310 A1 | 3/2016 | Holung et al. |
| 2016/0363962 A1* | 12/2016 | Chiu .................... G06F 1/1669 |

* cited by examiner

GEARED HOUSING ASSEMBLY

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; memory accessible by the processor; a first housing that includes a first geared edge and a processor; a second housing that includes a second geared edge and an electronic component accessible by the processor; and a link that operatively couples and meshes the first geared edge and the second geared edge. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
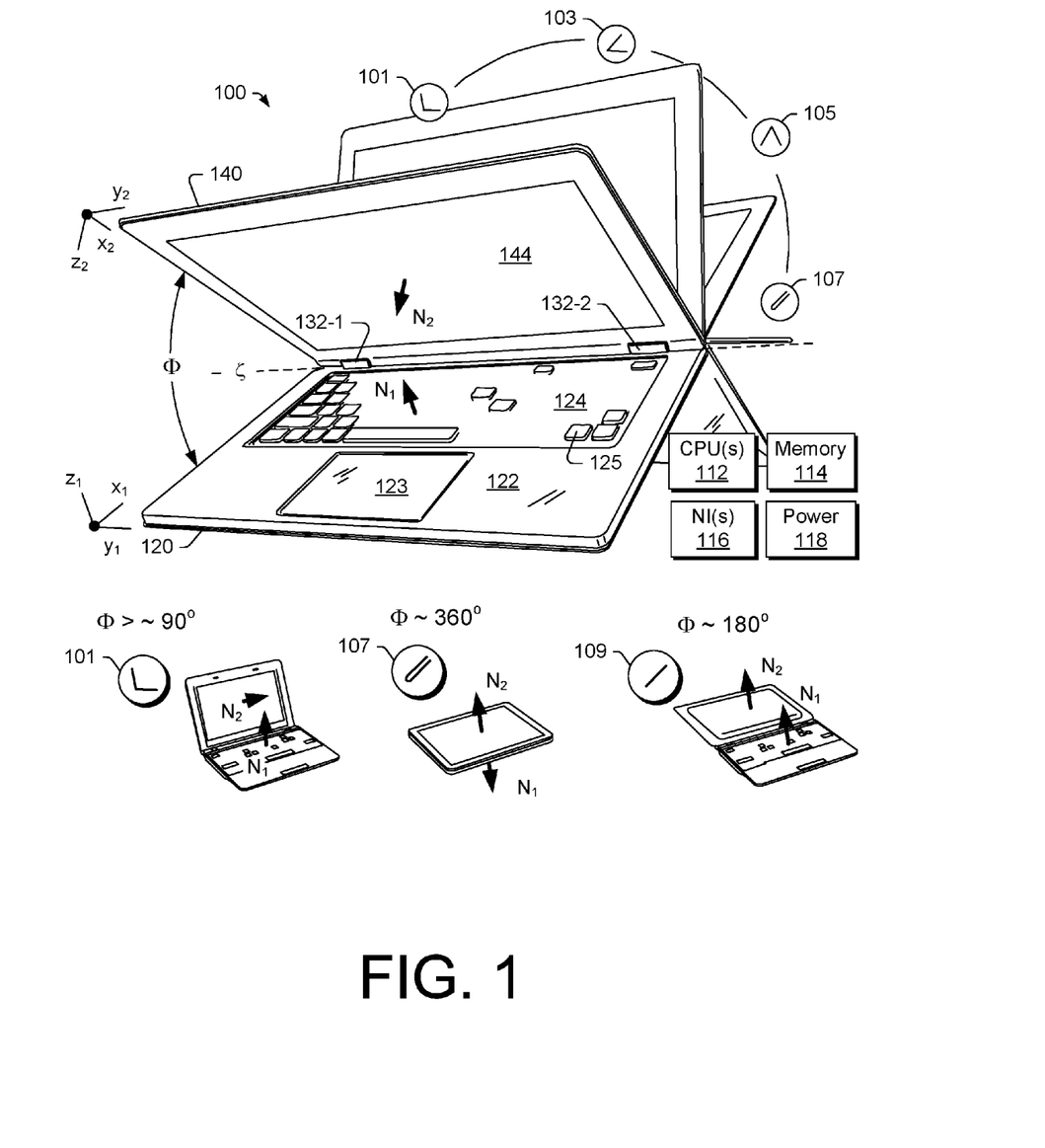
FIG. 1 is a diagram of examples of systems.

FIG. 1 shows an example of a system 100 that includes a keyboard housing 120 and a display housing 140 that are pivotable with respect to each other via movement about one or more hinges 132-1 and 132-2 (e.g., hinge assemblies). The system 100 may be a device such as, for example, a computing device (e.g., an information handling device).

As an example, the system 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Figure 2:
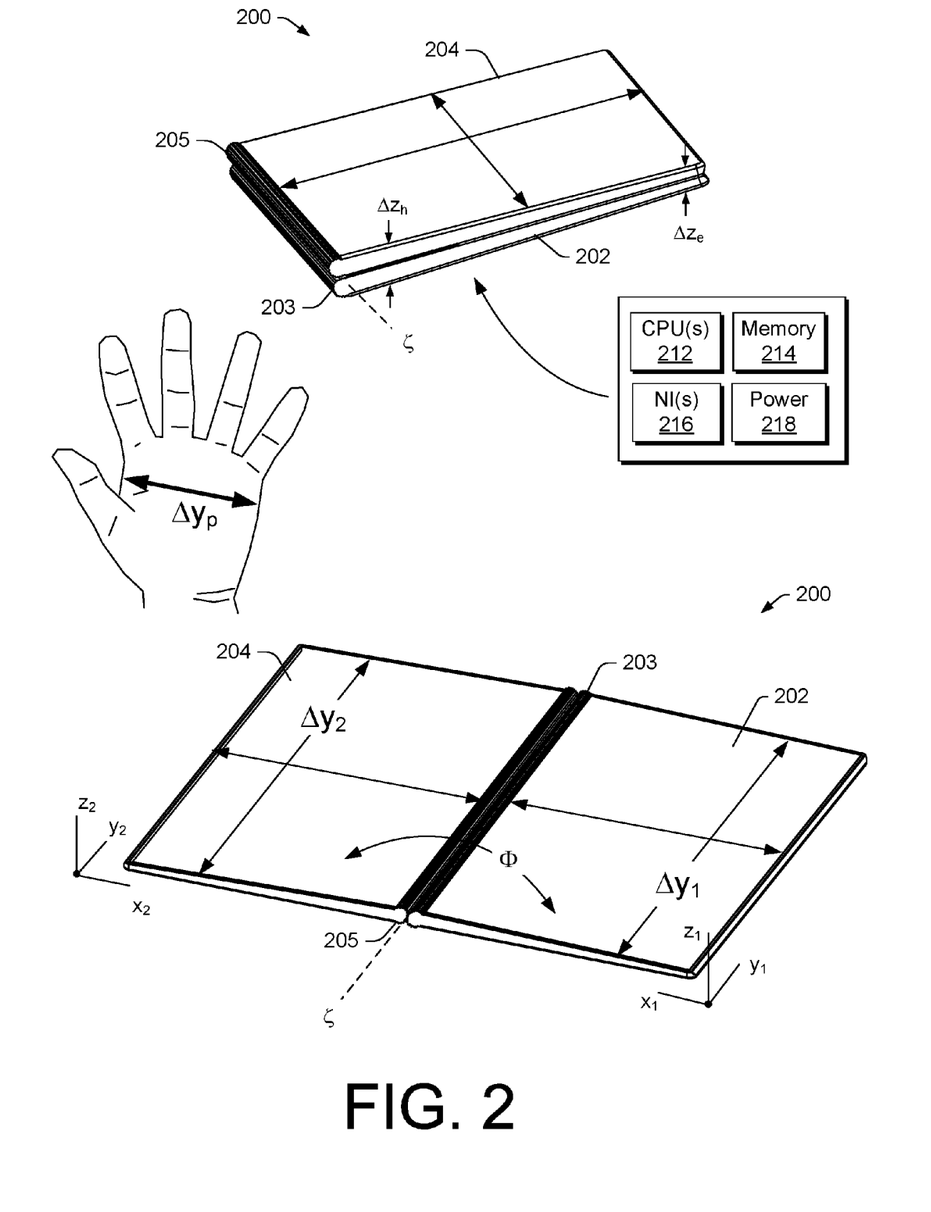
FIG. 2 is a diagram of an example of a device with a geared housing assembly.

FIG. 2 shows an example of a device 200 that includes a first housing 202, a second housing 204, a first geared edge 203 and a second geared edge 205. The device 200 can be a computing device (e.g., information handling device). As an example, the device 200 may be referred to as a system such as, for example, the system 100 of FIG. 1 with, however, a geared housing assembly as formed at least in part by the first geared edge 203 and the second geared edge 205.

In the example of FIG. 2, the first geared edge 203 may be machined or otherwise formed as an edge of the first housing 202 while the second geared edge 205 may be machined or otherwise formed as an edge of the second housing 204. A link or links can operatively couple the first housing 202 and the second housing 204 via the first geared edge 203 and the second geared edge 205 such that the geared edges 203 and 205 mesh in a manner that allows for rotation to orient the first housing 202 with respect to the second housing 204 and vice versa. In the example of FIG. 2, the geared edges 203 and 205 can be back edges while opposing edges can be front edges.

As an example, a link or links can provide for electrical connection(s) between electronic components of the first housing 202 and the second housing 204. For example, a link can include an opening or openings through which a wire can run from one housing to the other housing.

As shown in the example of FIG. 2, the device 200 can be oriented in a closed orientation (e.g., a closed state) and in an open orientation (e.g., an open state). In the closed orientation, a user may be at the front edges and grasp one of the front edges and rotate it with respect to the other front edge such that the geared edges 203 and 205 (e.g., back edges) mesh. As an example, the device 200 can be oriented at an intermediate orientation, for example, an orientation corresponding to an angle ($\Theta$) that is in a range from about 0 degrees to about 180 degrees. As an example, the device 200 may be oriented in a tablet orientation, which may be referred to as a back-to-back orientation of the first housing 202 and the second housing 204.

The geared edges 203 and 205 may be formed to be ergonomically acceptable to a user. For example, the geared edges 203 and 205 can include teeth that are relatively small in terms of their radial distance from a core portion, which may be circular in shape in cross-section (e.g., consider a portion of a circle). The number of teeth may be selected to provide for adequate meshing between the geared edges 203 and 205 over a desired range of angles while also maintaining tooth size as relatively small. As a geared edge may be of a dimension that is a considerable fraction of a housing edge dimension, force of a geared edge with respect to a human hand may be distributed (e.g., reduced in terms of force per cm squared, etc.). For example, consider a human hand depicted in FIG. 2 with a palm width $\Delta y_p$ where an adult male human hand on average may have a palm width of about 84 mm (about 3.3 inches) and an adult female human hand on average may have a palm width of about 74 mm (about 2.9 inches) and where a geared edge is at least approximately a palm width (e.g., about 74 mm or about 2.9 inches) or more. In such an example, contact between teeth of geared edges 203 and 205 may occur over a sufficient amount of skin surface of a palm of a hand such that the "feel" is ergonomically acceptable to a user for carrying the device 200 (e.g., in the closed orientation with the geared edges 203 and 205 in the palm of the user's hand). In the example of FIG. 2, $\Delta y_1$ and $\Delta y_2$ can be approximate dimensions of the geared edges 203 and 205 where $\Delta y_1$ and $\Delta y_2$ exceed $\Delta y_p$. In the example of FIG. 2, a maximum tooth radius of a geared edge as measured from a center of a core portion of the geared edge may be, for example, of the order of about 2.5 cm or less where, for example, a radius of the core portion is less than about 95 percent of the maximum tooth radius (e.g., the difference therebetween defining a tooth length).

As an example, the device 200 may include one or more processors 212, memory 214 (e.g., one or more memory devices), one or more network interfaces 216, and one or more power cells 218. Such components may be, for example, housed with the first housing 202 and/or the second housing 204.

In the example of FIG. 2, the device 200 can include one or more types of circuitry, optionally one or more types of circuitry as described with respect to the system 100 of FIG. 1. As an example, the device 200 can include a flexible circuit board that spans at least a portion of the first housing 202 and that spans at least a portion of the second housing 204. In such an example, the first geared edge 203 and the second geared edge 205 can define a radius of curvature that allows for bending of the flexible circuit board. For example, the radius of curvature may allow for repeated bending and unbending of the flexible circuit board over a number of cycles where one or more circuits that extend across the bend can operate without an excessive risk of failure.

As an example, the device 200 can include multiple circuit boards where, for example, one or more flexible connectors (e.g., wires, optical guides, etc.) connect two or more of the circuit boards, which may be disposed in different housings. For example, consider a first circuit board disposed in the first housing 202 and a second circuit board disposed in the second housing 204 being operatively coupled via wires and/or optical guides that span the first and second housings 202 and 204 across first geared edge 203 and the second geared edge 205.

As an example, the device 200 can include a display that includes at least one flexible portion. In such an example, the display can be disposed at least in part in the first housing 202 and be disposed at least in part in the second housing 204 where the geared edges 203 and 205 define a minimum radius of curvature in the closed orientation of the device 200 that avoids damage to the display. As an example, such a display may be a touchscreen display where, for example, one portion of the touchscreen display may render a graphic of a keyboard (e.g., a computer keyboard with letter keys, etc.). For example, consider the first housing 202 including a portion of a touchscreen display that can be utilized as a keyboard and the second housing 204 including a portion of a touchscreen display that can be utilized as a display. As an example, such a device may automatically detect a device orientation to determine which portion of the touchscreen display is to be a keyboard and which portion of the touchscreen display is to be a display. For example, the device 200 can be operated with the first housing 202 on a planar surface (e.g., a desk), on a lap, etc. or the device 200 may be operated with the second housing 204 on a planar surface, on a lap, etc. In such an example, a user need not necessarily be aware of an orientation of the device 200 (e.g., the device 200 can be self-aware and configure itself responsive to sensing its own orientation in space, for example, with respect to gravity, etc.).

As an example, the device 200 can include two displays where, for example, one display is disposed in the first housing 202 and where the other display is disposed in the second housing 204. As an example, the first housing 202 and/or the second 204 can be a frame where, for example, a display can be oriented outwardly. For example, consider the closed orientation of the device 200 where the second housing 204 includes an outwardly facing display, which may be a touchscreen display. In such an example, the device 200 may be operated in a tablet mode. As an example, upon opening the device 200, the device 200 may transition from a tablet mode to a laptop mode or another mode, as desired. For example, in the open orientation of FIG. 2, the device may be operated in a tablet mode where the tablet screen size is approximately the size of the two housings 202 and 204 combined. In such an example, the device 200 may be in an extended tablet mode. As an example, upon transitioning the device 200 to an angle less than about 180 degrees (e.g., about 170 degrees or less), the device 200 may transition to a laptop (e.g., notebook) mode. In such a laptop mode, one of the housings 202 and 204 can include a keyboard portion, which may be rendered to a touchscreen display.

As an example, an apparatus can include a processor; memory accessible by the processor; a first housing that includes a first geared edge; a second housing that includes a second geared edge; and a link that operatively couples and meshes the first geared edge and the second geared edge.

As an example, a first geared edge and a second geared edge may be linked to define a hinge. As an example, a hinge can include gear teeth on a back edge of an upper (screen) half of a laptop and gear teeth on a back edge of a lower (keyboard) side of the laptop. When such a laptop is opened, the gear teeth on the screen half can roll along the gear teeth on the keyboard half, so that by rotating the screen about 360 degrees, it is also moved to the opposite side of the keyboard from its original position, correctly placed for "tablet mode". Such an approach may be implemented with relatively few moving parts in comparison to various other 360 degree hinges.

In a geared edge approach, force applied to the gear teeth (e.g., via meshing between gear teeth) can be relatively high; however, for aesthetics, the gear teeth size may be minimal (e.g., for hand carrying comfort). As an example, gear teeth may be made of one or more types of material, which may include metal (e.g., metal or alloy) and/or plastic (e.g., polymeric). As an example, a geared edge may be machined or otherwise formed as part of a housing.

As an example, where a device is of a relatively low mass and relatively small size (e.g., consider a display less than about 20 inches diagonally or about 50 cm diagonally), relatively long geared edges may be utilized to reduce force experienced by such geared edges. As an example, a geared edge may be about 4 inches long or more (e.g., about 10 cm long or more), as a width of a housing. As an example, a housing can be less than about 2 inches in thickness (e.g., less than about 5 cm in thickness). As an example, a housing can be less than about 1 inch in thickness (e.g., less than about 2.5 cm in thickness). As an example, a housing may be of a length, from back edge to front edge, that is about 4 inches or more (e.g., about 10 cm or more).

As an example, a geared edge may be formed of a molded plastic, which may result in lesser cost than machined metal (e.g., or machined alloy). Where a geared edge is integral to a housing, visible separations on the exterior of a computing device (e.g., clamshell device) may be minimized. As an example, a housing may be extruded where a geared edge is formed via an extruder die having a shape that imparts gear teeth or, for example, via a tool that imparts gear teeth in an edge after a housing without gear teeth exits an extruder die.

For example, an extruder die can include a shape to form a housing with a radiused edge that is a portion of a circle in cross-section joined to a planar portion such that the radiused edge is of a larger thickness than the planar portion. In such an example, a tool may form teeth in the radiused edge by forming and/or removing material, which may be in a desired state upon exiting an extruder or other forming machine. For example, the material may be a thermoplastic material that is soft enough to be shaped by a tool that forms teeth in an edge (e.g., back edge) of a housing after the housing exits a forming machine that forms "raw" thermoplastic material into a stock shape.

As an example, a gear can be larger in diameter than the face width of its teeth. With a small gear diameter, the width of the teeth might be twice or three times the diameter. Such a gear can be made and installed on a back edge of housing of a laptop computing device. When compared to an integral gear, an assembly step is involved to attach the gear to the housing of the laptop computing device.

As an example, a geared edge may include teeth over an angle of about 200 degrees of a circumference of a back edge of a housing such as a screen and/or a keyboard portion of a laptop computing device. In such an example, the teeth in the 200 degree span can be fixed in place, unable to rotate in relation to a respective half of the laptop computing device.

As shown in the example of FIG. 2, a method can include creating gear teeth as part of a housing (e.g., an external cover) of a clamshell computing device. As an example, such a housing may be made via injection molding using plastic (e.g., a polymeric material) where teeth are included as part of a mold. As mentioned, a method may include machining a housing or housings with teeth from metal or plastic.

As an example, a geared edge may have a width that is up to approximately 100 percent of the width of a clamshell computing device (see, e.g., dimensions $\Delta y_1$ and $\Delta y_2$ in FIG. 2). In such an example, with such a relatively long gear, force can be spread out, which may allow for use of materials that are softer than hardened metals or hardened alloys. As an example, where geared edges are utilized, fewer assembly steps may result. For example, where geared edges are integrally formed as respective portions of two housings, gears do not need to be attached in an attachment step of an assembly process; though, a linking process may include installation of one or more links that operatively couple geared edges.

As an example, where a housing is made of metal (e.g., metal or metal alloy), a geared edge may be machined during a machining process that machines the housing for one or more other purposes.

As mentioned, integral gears (e.g., housings with geared edges) can reduce part count of a computing device, which may reduce various costs and/or assembly times. As mentioned, an aesthetic benefit may result from a lack of a visible gap between gears and housings where they are integral and, made of the same material, optionally with a similar or same type of finish.

Figure 3:
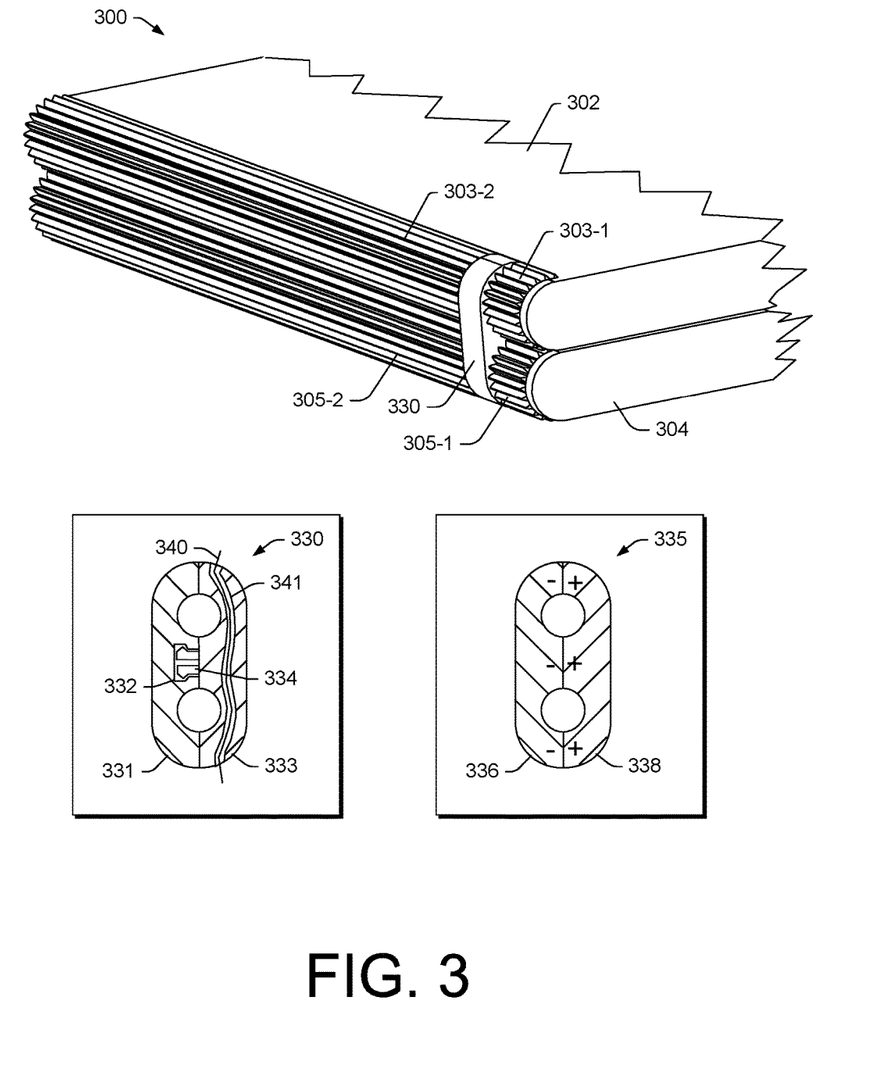
FIG. 3 is a diagram of an example of a portion of a geared housing assembly.

FIG. 3 shows a portion of an example of an assembly 300 that includes a first housing 302 with two geared edge portions 303-1 and 303-2 and a second housing 304 with two geared edge portions 305-1 and 305-2. In the example of FIG. 3, a link 330 operatively couples the geared edge portions 303-1 to 305-1 and 303-2 to 305-2. FIG. 3 shows an enlarged cut-away view of the link 330 and an example of a link 335.

In the view of the link 330, two pieces 331 and 333 are shown where the piece 331 includes a recess 332 and where the piece 333 includes resilient prongs 334 that can be received by the recess 332 to couple the pieces 331 and 333 about axles of the first housing 302 and the second housing 304. As an example, the link 330 may be separable via application of force, as the recess 332 can include sloped (e.g., chamfered) edges that cause the prongs 334 to move towards each other such that the piece 333 can be separated from the piece 331. In such an example, a user may separate the first housing 302 from the second housing 304. As an example, the first housing 302 and/or the second housing 304 can include a processor or processors that may allow for use of each of the housings as an independent computing device or, for example, as a base device and a mobile device that communicate via wireless communication circuitry (e.g., WiFi technology, BLUETOOTH technology, etc.).

In the view of the link 335, two pieces 336 and 338 are shown where at least one of the pieces is magnetic. For example, where one piece is a magnet, the other piece can be made of a ferromagnetic material (e.g., a material including iron) such that the two pieces can be joined and held together via magnetic force. As an example, both pieces may be magnets where they join to couple an axle of the first housing 302 and an axle of the second housing 304. As mentioned, a link may be separable via application of force such as, for example, force applied by a hand or hands of a user. As an example, a user may pull the pieces 336 and 338 apart such that the housings 302 and 304 can be separated and, for example, utilized separately or at a distance from each other, optionally via wireless communication circuitry (e.g., WiFi technology, BLUETOOTH technology, etc.).

FIG. 3 also shows the link 330 as optionally including a passage or passages 341 for a wire or wires 340. In such an example, the link 330 can include one or more openings that allow for passage of a wire or wires from the housing 302 to the housing 304 where such a wire or wires can electrically couple one or more electronic components. As an example, a wire or wires may be fitted with a connector or connectors. For example, where a link or links are to be removed to allow for separation of the housings 302 and 304, a connector may be detached to allow for decoupling one or more electrical connections between the housings 302 and 304. As mentioned, where wireless circuitry is present in both of the housings 302 and 304, one or more electronic components may communicate information.

As an example, a portion of a geared edge of a first housing can include an electrical conductor that can be in contact with a portion of a geared edge of a second housing such that power may be transmitted from one of the housings to the other (e.g., optionally vice versa). For example, a portion or portions of each of two geared edges may be coated with a metallic conductive material such that contact between the portions allow for transmission of electrical power (e.g., from a battery such as a lithium ion battery of one of the housings to the other of the housings). As an example, a housing may include wireless charging circuitry to allow for charging a battery thereof via a wireless transmission mechanism.

As an example, a link may provide for transmission of power from one housing to another housing. As an example, an axle of a first housing can include a conductive material that can be electrically coupled to an axle of a second housing. In such an example, a link or links and/or a wire or wires may electrically couple the axles.

Figure 4:
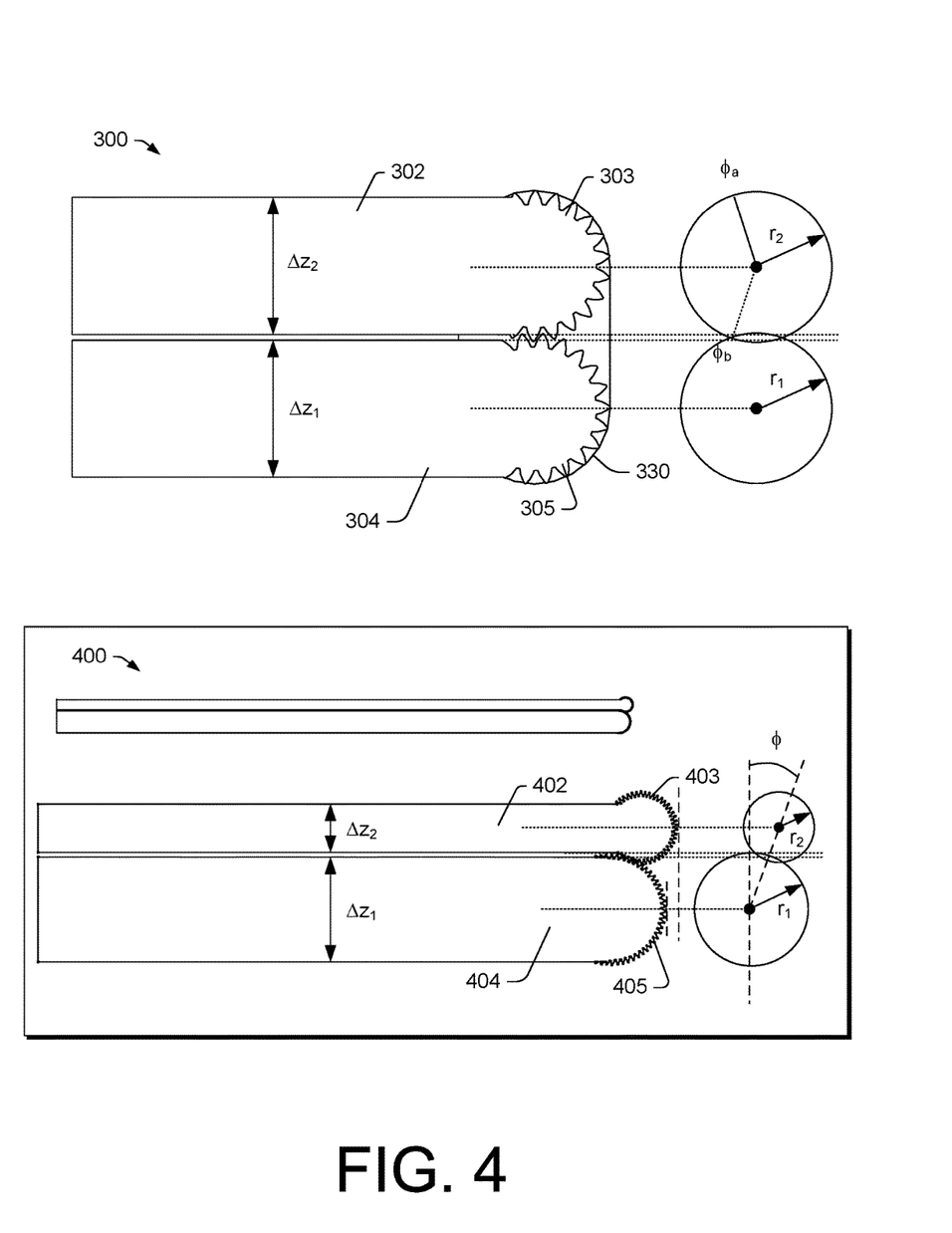
FIG. 4 is a diagram of an example of a portion of a geared housing assembly.

FIG. 4 shows a side view of the portion of the assembly 300 where teeth of the integral geared edges 303 and 305 of the housings 302 and 304 are shown as meshing. As shown, the housings 302 and 304 are of approximately the same thicknesses ($\Delta z_2$ and $\Delta z_1$) and outer radii are also approximately the same ($r_2$ and $r_1$). In the closed orientation shown, the axes (e.g., axle axes) are stacked vertically and the housings are separated by a gap distance, noting that portions of the housings 302 and 304 can contact each other (e.g., consider extensions, pads, etc.). In such an example, where the housing 302 includes a display and where the housing 304 includes a keyboard, surfaces may be separated by the gap distance such that the keyboard does not contact the display; noting that contact may cause markings on the display.

FIG. 4 also shows a side view of a portion of an assembly 400 that includes housings 402 and 404 where integral geared edges 403 and 405 differ in size. As shown in FIG. 4, housing thicknesses ($\Delta z_2$ and $\Delta z_1$) may be selected and corresponding gear radii ($r_2$ and $r_1$). As an example, a thinner housing may be a display housing whereas a thicker housing may be a base housing, which may include, for example, a keyboard. As shown in the closed orientation, the axes (e.g., axle axes) are not vertically stacked because the housing 402 is displaced from the housing 404 such that the length of the housing 402 can be greater than the length of the housing 404. As shown, the axes are offset in the closed orientation from vertical by an angle φ, which may be about 20 degrees from vertical or about 70 degrees from horizontal. Thus, where housing thicknesses differ for two housings, in a closed orientation, axes, which may correspond to axles, can be offset by an angle. Further, as shown in FIG. 4, the geared edge 403 of the housing 402 is disposed below a planar, horizontal surface of the housing 404. As to operation to reorient the housings 402 and 404, the geared edge 403 can travel over an arc of about 140 degrees (e.g., given an offset angle of about 20 degrees from vertical or about 70 degrees from horizontal) when transitioning from a closed orientation (shown) to a back-to-back orientation. In contrast, for the assembly 300 as shown in FIG. 4, given that the axes are stacked (e.g., 0 degrees from vertical or 90 degrees from horizontal), a corresponding transition would be approximately 180 degrees. Thus, as illustrated in FIG. 4, various relationships can exist between housing thicknesses, radii of teeth of geared edges and transitions from one orientation to another orientation.

In the example of FIG. 4, the assembly 300 includes geared edges with teeth that span an arc angle from angle $\phi_a$ to $\phi_b$ where $\phi_a$ and $\phi_b$ are about 20 degrees offset from vertical (towards the planar portion of the housing 302). Thus, about 14 teeth span an angle of about 220 degrees (e.g., 20+180+20). As to the assembly 400, about 40 teeth span an angle of about 280 degrees (e.g., 50+180+50) for the housing 402 and about 40 teeth span an angle of about 220 degrees (e.g., 20+180+20). As an example, a housing can include a geared edge that includes at least approximately 10 teeth. As an example, a housing can include a geared edge that includes at least approximately 20 teeth. As an example, a housing can include a geared edge that includes at least approximately 30 teeth.

Figure 5:
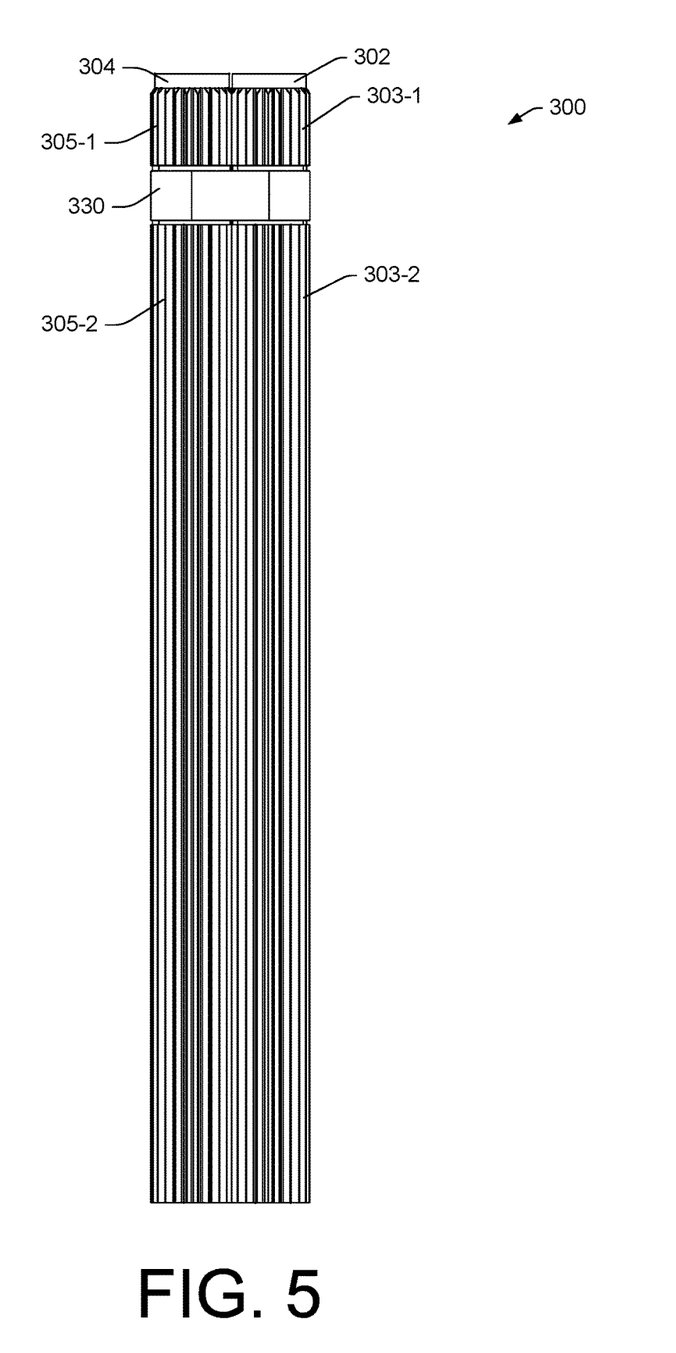
FIG. 5 is a diagram of an example of a geared housing assembly.

FIG. 5 shows a side view of the assembly 300 where various features are illustrated, including the geared edge portions 303-1, 303-2, 305-1 and 305-2 along with the link 330.

Figure 6:
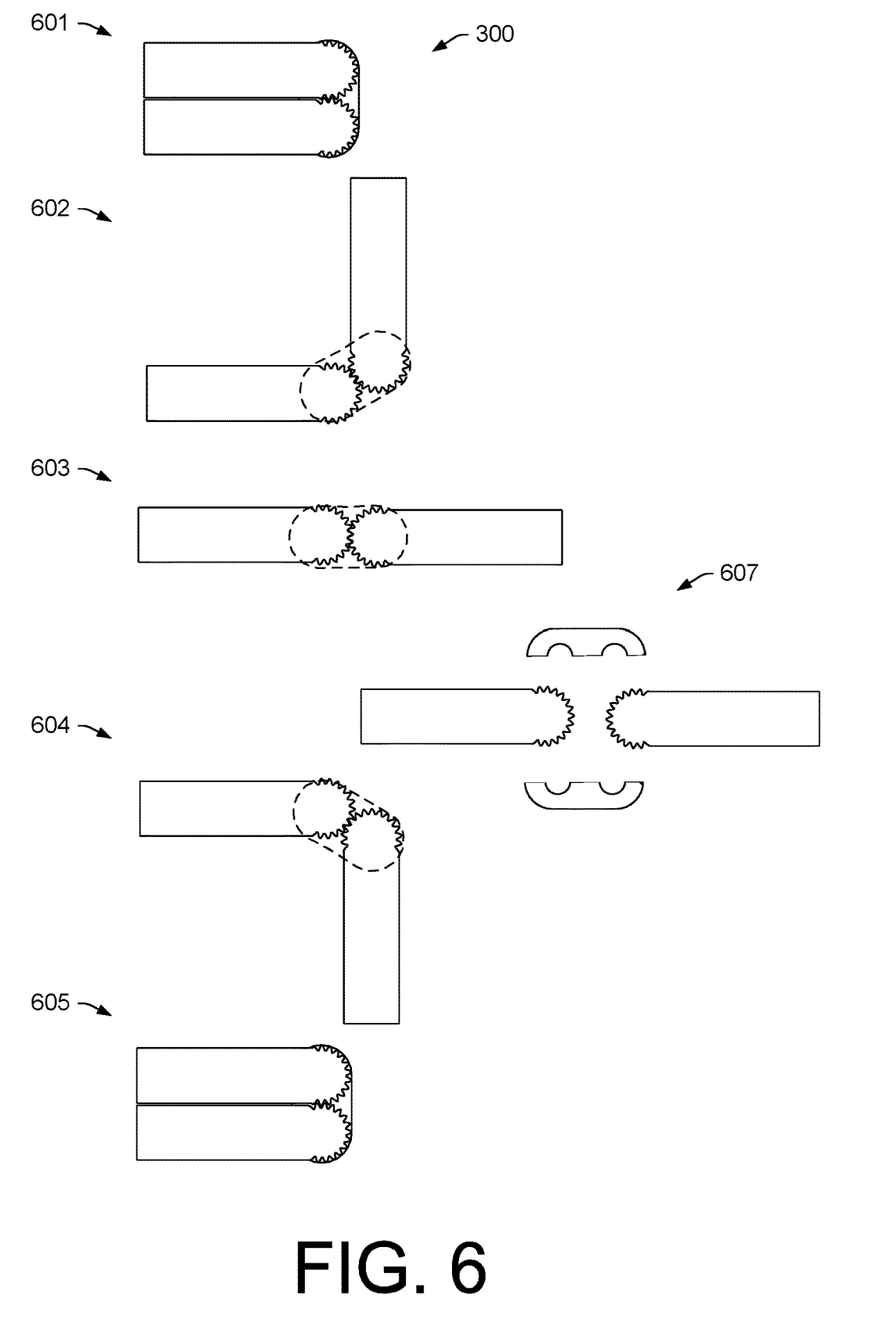
FIG. 6 is a series of views of diagrams of an example of a geared housing assembly.

FIG. 6 shows five different orientations 601, 602, 603, 604, and 605 of the assembly 300, which can be a clamshell assembly such as a clamshell computing device. As shown, the orientations include a front-to-front orientation 601, a planar orientation 603 and a back-to-back orientation 605.

As mentioned with respect to FIG. 4, for the assembly 300, a transition from the orientation 601 (e.g., closed) to the back-to-back orientation 605 can involve about 180 degrees of motion as to an arc swept by one axis (e.g., axle) with respect to another axis (e.g., axle) of the geared edges 303 and 305; whereas, for the assembly 400 of FIG. 4, such an arc can be less (e.g., due to an offset angle φ), while still providing for a closed orientation and a back-to-back orientation.

Figure 7:
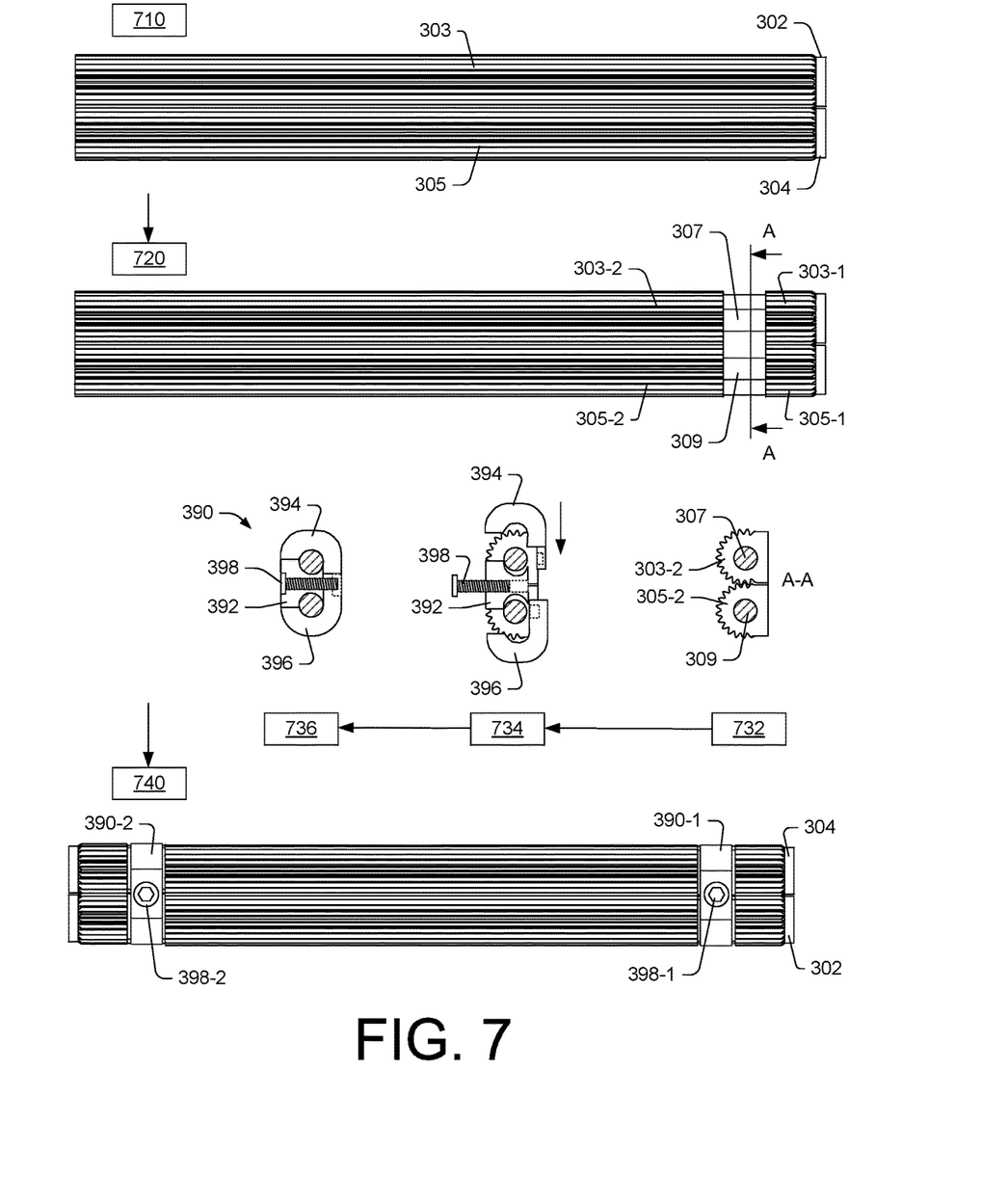
FIG. 7 is a series of views of diagrams of an example of a geared housing assembly and a method.

FIG. 6 also shows an example state 607 where housings with geared edges can be separated, for example, by decoupling one or more links (see, e.g., FIG. 3 and FIG. 7). In such an example, one or both of the housings may be usable as a computing device (e.g., information handling device) optionally independent of the other or, for example, via one or more connections with the other (e.g., via wire and/or via wireless circuitry). As an example, one or more mechanisms may provide for decoupling in an orientation such as the orientation 603 where, for example, one portion of a link may be detached from another to allow housings to be separated with respect to their corresponding geared edges.

FIG. 7 shows a method that includes, per a block 710, providing a first housing 302 with a geared edge 303 and a second housing 304 with a geared edge 305. Per a block 720, the geared edges 303 and 305 are machined or otherwise formed to include axles 307 and 309 disposed between geared edge portions 303-1 and 303-2 and between geared edge portions 305-1 and 305-2, respectively.

Per blocks 732, 734 and 736, a link 390 can be utilized to operatively couple the geared edge portions 303-1 and 305-1 and 303-2 and 305-2. As shown, in various views along a line A-A, the link 390 can include multiple pieces 392, 394, 396 and 398 that can fit together and be secured, for example, via the piece 398, which may be a bolt or screw. For example, the piece 392 may be set between the axles 307 and 309 while the pieces 394 and 396 are translated inwardly to couple such that the piece 398 can secure the pieces 392, 394 and 396. In such an example, journals are formed for the axles.

Per the block 740, an assembly can include one or more of such links, for example, consider two links 390-1 and 390-2 where pieces 398-1 and 398-2 secure each of the respective links 390-1 and 390-2. As mentioned, a link or links such as the link 330 and/or the link 335 may be utilized (see, e.g., FIG. 3).

Figure 8:
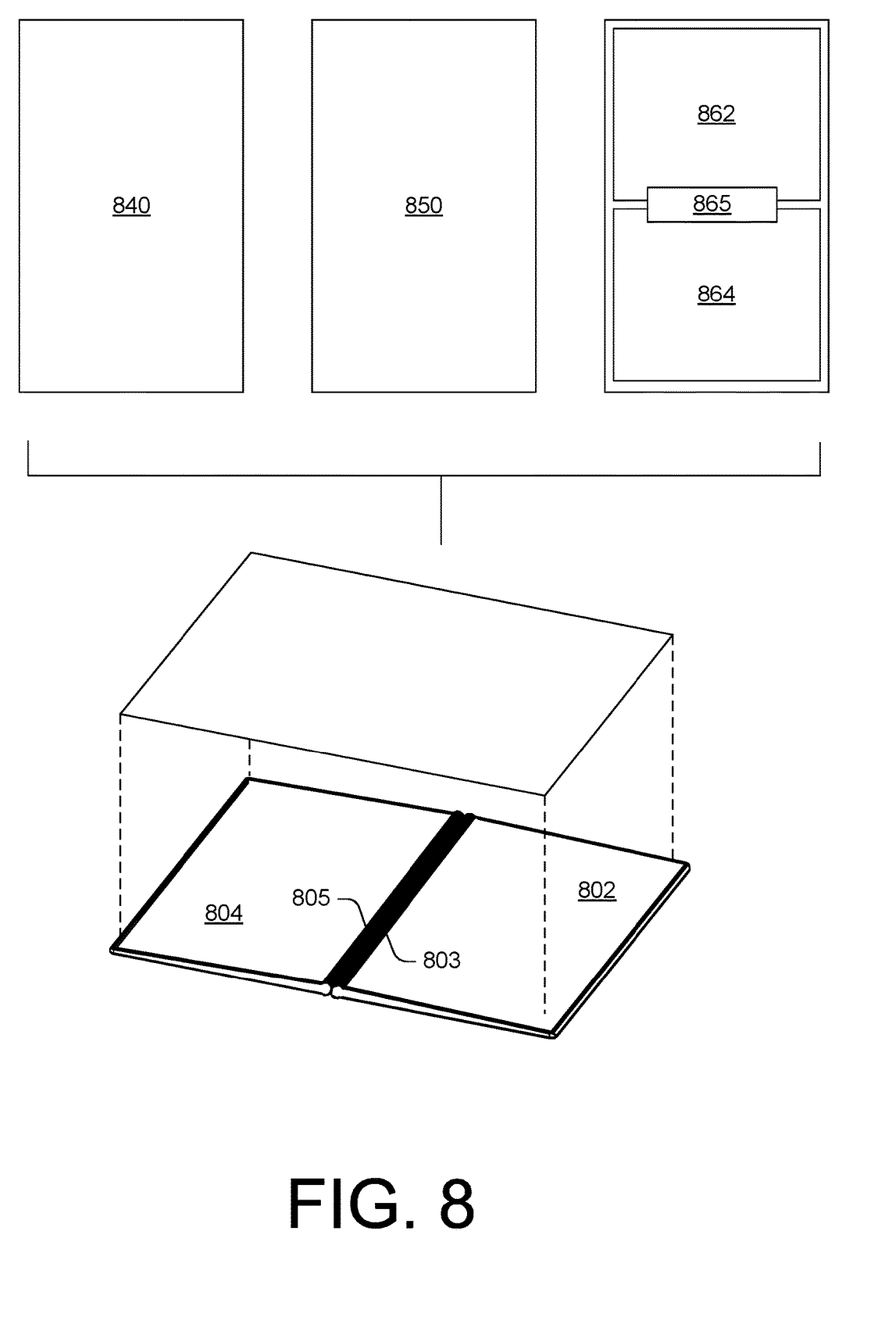
FIG. 8 is a series of diagrams of examples of circuitry that may be included in a system with a geared housing assembly.

FIG. 8 shows examples of circuitry 840, 850 and 862, 864 and 865. Such circuitry may be received via a first housing 802 and a second housing 804 where, for example, geared edges 803 and 805 form a hinge for orientation of the first housing 802 and the second housing 804. As an example, one or more links can be included that can operatively couple the geared edges 803 and 805 for meshed engagement. As an example, the circuitry 840 may be a flexible display (e.g., optionally a flexible touchscreen display), the circuitry 850 may be a flexible circuit board, and the circuitry 865 may be flexible and operatively couple the circuitry 862 and the circuitry 864 (e.g., which may include display and/or other circuitry). For example, the circuitry 865 may be or include flexible wires, flexible optical guides (e.g., flat, fiber, etc.). As an example, a housing can include one or more ports that may allow for connections (e.g., power, display, bus, memory, etc.). As an example, one or more connections may provide for electrical and/or optical connection(s) to circuitry that can be housed in the first housing 802, the second housing 804 or the first and second housings 802 and 804.

As an example, an assembly may be attachable and detachable. As an example, an assembly can include one or more keys and/or keyways along back edges of housing where such back edges are geared. In such an example, a key and keyway pair may facilitate attachment of a first housing to a second housing in a manner where geared edges mesh.

As an example, an apparatus can include a processor; memory accessible by the processor; a first housing that includes a first geared edge and a processor; a second housing that includes a second geared edge and an electronic component accessible by the processor; and a link that operatively couples and meshes the first geared edge and the second geared edge. In such an example, at least one of the first housing and the second housing can be or can include a metal housing with a metal geared edge. As an example, at least one of the first housing and the second housing can be or can include a polymeric housing with a polymeric geared edge.

As an example, a first housing and a second housing can form a clamshell. In such an example, the clamshell can include a closed orientation and a planar orientation and, for example, optionally a back-to-back orientation.

As an example, a first geared edge and a second geared edge can include a common radius (e.g., teeth of each geared edge being of approximately the same radius, as a common radius). As an example, a first geared edge can include a first radius (e.g., a gear teeth radius) and the second geared edge can include a second, different radius (e.g., a gear teeth radius).

As an example, a first housing can be defined by a first thickness and a second housing can be defined by a second thickness where, for example, the first thickness may differ from the second thickness. In such an example, the thicknesses may be maximum thicknesses of the housings (e.g., largest measurable thicknesses of each of the housings).

As an example, a first housing can include a keyboard and/or a second housing can include a display. In such an example, the keyboard and the display can be electronic components operatively coupled to at least one processor.

As an example, an apparatus can include two housings, each having a geared edge (e.g., back edge) and one or more links that link the two housings.

As an example, a first housing and a second housing may be detachable and reattachable via a first geared edge and a second geared edge. In such an example, the first housing and the second housing can be detachable and reattachable in a planar orientation (see, e.g., FIG. 2).

As an example, a first housing can include a thickness that is less than a thickness of a second housing where a first geared edge of the first housing has a radius that is less than a radius of a second geared edge of the second housing. In such an example, one-half of the thickness of the first housing can be less than the radius of the first geared edge. As an example, one-half of the thickness of the second housing can be approximately equal to the radius of the second geared edge.

As an example, a first housing can be a display housing and/or a second housing can be a keyboard housing. Such housings can include one or more electronic components, which may be operatively coupled to at least one processor, which may be via wire, wires and/or wireless circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 9:
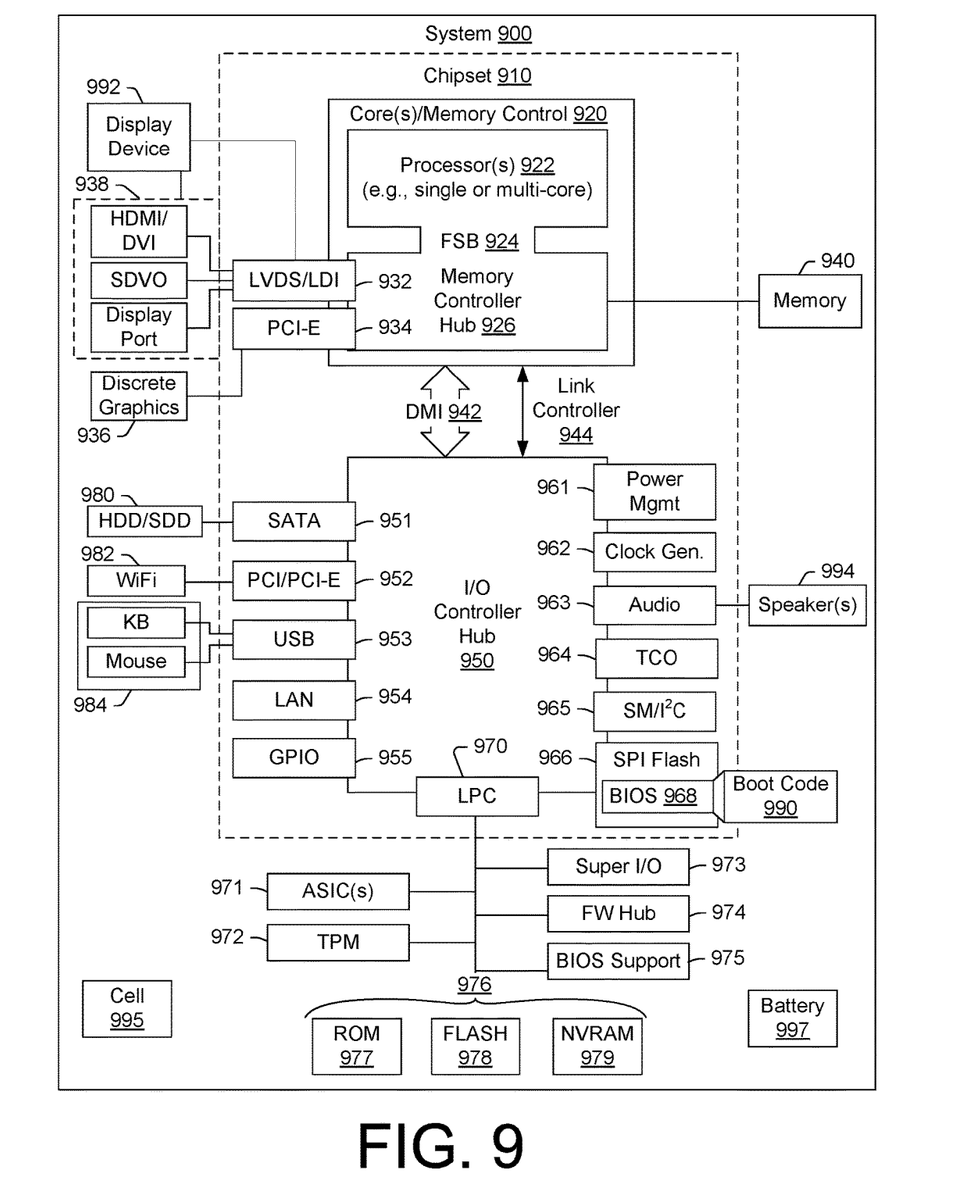
FIG. 9 is a diagram of an example of a system that includes one or more processors.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As an example, a system such as the system 100 of FIG. 1 may include at least some of the features of the system 900; a device such as the device 200 of FIG. 2 may include at least some of the features of the system 900; etc.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., $I^2C$, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG.

9 is battery circuitry 997, which may provide one or more battery, power, etc., associated features (e.g., optionally to instruct one or more other components of the system 900). As an example, a SMBus may be operable via a LPC (see, e.g., the LPC interface 970), via an I$^2$C interface (see, e.g., the SM/I$^2$C interface 965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory accessible by the processor;
   a first housing that comprises opposing sides that extend to a first fixed geared back edge that is formed integrally with the first housing to define a first housing thickness less than approximately 25 mm and that comprises the processor, wherein the first fixed geared back edge spans a mid-point of the first housing along the first fixed geared back edge;
   a second housing that comprises opposing sides that extend to a second fixed geared back edge that is formed integrally with the second housing to define a second housing thickness less than approximately 25 mm and that comprises an electronic component accessible by the processor, wherein the second fixed geared back edge spans a mid-point of the second housing along the second fixed geared back edge;
   a closed orientation of the first and second housings wherein a display of one of the first and second housings faces inwardly and wherein the first fixed geared back edge and the second fixed geared back edge form a palm contact carrying surface that comprises a width of at least approximately 74 mm that spans the mid-points of the first and second housings;
   a tablet orientation of the first and second housings wherein the display faces outwardly and wherein the first fixed geared back edge and the second fixed geared back edge form a palm contact carrying surface that comprises a width of at least approximately 74 mm that spans the mid-points of the first and second housings; and
   a link that operatively couples and meshes the first fixed geared back edge and the second fixed geared back edge for transitions between the closed orientation and the tablet orientation.

2. The apparatus of claim 1 wherein at least one of the first housing and the second housing comprises a metal housing and a metal fixed geared back edge that is formed integrally with the metal housing.

3. The apparatus of claim 1 wherein at least one of the first housing and the second housing comprises a polymeric housing and a polymeric fixed geared back edge that is formed integrally with the polymeric housing.

4. The apparatus of claim 1 wherein the first housing and the second housing form a clamshell, wherein the clamshell comprises the closed orientation, the tablet orientation and a planar orientation.

5. The apparatus of claim 1 wherein the first fixed geared back edge and the second fixed geared back edge comprise a common radius.

6. The apparatus of claim 1 wherein the first fixed geared back edge comprises a first radius and the second fixed geared back edge comprises a second, different radius.

7. The apparatus of claim 1 wherein the first housing comprises a first thickness and wherein the second housing comprises a second thickness wherein the first thickness differs from the second thickness.

8. The apparatus of claim 1 wherein the first housing comprises a keyboard.

9. The apparatus of claim 1 wherein the second housing comprises the display.

10. The apparatus of claim 1 comprising two links.

11. The apparatus of claim 1 wherein the first housing and the second housing are detachable and reattachable via the first fixed geared back edge and the second fixed geared back edge.

12. The apparatus of claim 11 wherein the first housing and the second housing are detachable and reattachable in a planar orientation.

13. The apparatus of claim 1 wherein the first housing comprises a thickness that is less than a thickness of the second housing and wherein the first fixed geared back edge comprises a radius that is less than a radius of the second fixed geared back edge.

14. The apparatus of claim 13 wherein one-half of the thickness of the first housing is less than the radius of the first fixed geared back edge.

15. The apparatus of claim 14 wherein one-half of the thickness of the second housing is approximately equal to the radius of the second fixed geared back edge.

16. The apparatus of claim 13 wherein the first housing comprises a display housing.

17. The apparatus of claim 16 wherein the second housing comprises a keyboard housing.

18. An apparatus comprising:
    a processor;
    memory accessible by the processor;
    a first housing that comprises a first geared edge and the processor, wherein the first geared edge is formed integrally with the first housing, wherein the first geared back edge spans a mid-point of the first housing along the first geared back edge;
    a second housing that comprises a second geared edge and an electronic component accessible by the processor, wherein the second geared edge is formed integrally with the second housing, wherein the second geared back edge spans a mid-point of the second housing along the second geared back edge; and
    a link that operatively couples and meshes the first geared edge and the second geared edge,
    wherein the first housing comprises a thickness that is less than a thickness of the second housing and wherein the first geared edge comprises a radius that is less than a radius of the second geared edge.

19. The apparatus of claim 18 wherein the first housing comprises a display housing and wherein the second housing comprises a keyboard housing.

20. The apparatus of claim 19 wherein, in a closed orientation of the first and second housings, an axis of the first geared edge and an axis of the second geared edge define an offset angle.

* * * * *